USO11241979B2

United States Patent
Vincent et al.

(10) Patent No.: US 11,241,979 B2
(45) Date of Patent: Feb. 8, 2022

(54) METHOD OF MULTI-DIRECTIONAL SEAT ADJUSTMENT USING A POLAR COORDINATE SYSTEM BASED USER INTERFACE

(71) Applicant: BYTON NORTH AMERICA CORPORATION, Santa Clara, CA (US)

(72) Inventors: Chan Vincent, Dublin, CA (US); Johnson Mark, Santa Clara, CA (US)

(73) Assignee: BYTON NORTH AMERICA CORPORATION, Santa Clara, CA (US)

( * ) Notice: Subject to any disclaimer, the term of this patent is extended or adjusted under 35 U.S.C. 154(b) by 8 days.

(21) Appl. No.: 16/565,468

(22) Filed: Sep. 9, 2019

(65) Prior Publication Data
US 2021/0070196 A1 Mar. 11, 2021

(51) Int. Cl.
*B60K 37/00* (2006.01)
*B60N 2/02* (2006.01)
*B60K 35/00* (2006.01)
*G06F 3/0488* (2022.01)

(52) U.S. Cl.
CPC ............ *B60N 2/0232* (2013.01); *B60K 35/00* (2013.01); *G06F 3/04883* (2013.01); *B60K 2370/11* (2019.05); *B60K 2370/1438* (2019.05)

(58) Field of Classification Search
CPC ... B60N 2/02; B60N 2/04; B60N 2/06; B60N 2/10; B60N 2/12; B60N 2/0232; B60N 2/0244; B60N 2/0248; B60K 35/00; B60K 2370/11; B60K 2370/1438; B60K 2370/1468; G06F 3/04883; A47C 31/008; A61H 2201/5043; A61H 2201/5046
USPC .......................................... 297/217.3; 701/49
See application file for complete search history.

(56) References Cited

U.S. PATENT DOCUMENTS

| 9,841,884 B2 * | 12/2017 | Nagara ................. B60N 2/0248 |
| 9,857,962 B2 * | 1/2018 | Yui ......................... G06F 3/0488 |
| 2009/0024683 A1 * | 1/2009 | Beckman ................. G06F 7/548 708/442 |
| 2010/0176632 A1 * | 7/2010 | Alford ............... B64D 11/0646 297/217.3 |

(Continued)

*Primary Examiner* — Mahelet Shiberou
(74) *Attorney, Agent, or Firm* — Womble Bond Dickinson (US) LLP

(57) ABSTRACT

Described herein are various embodiments for using a touch screen with polar coordinates thereon to control the movements of seats in a vehicle. An exemplary method of adjusting seats in a vehicle includes the operations of detecting a touching on a circumference of a circular graphic on a touch screen in a vehicle, wherein the circular graphic is in a polar coordinate system on the touch screen; and determining a polar angle formed by a point of the touching on the circumference of the circular graphic in the polar coordinate system. The method further includes the operations of calculating a first value and a second value associated with the polar angle, each of the first value and the second value representing a movement range in a direction; and adjusting a vehicle seat based on the first value and the second value, including simultaneously moving the vehicle seat in in a first direction indicated by the first value and a second direction indicated by the second value.

20 Claims, 9 Drawing Sheets

(56) References Cited

U.S. PATENT DOCUMENTS

| | | | |
|---|---|---|---|
| 2010/0318266 A1* | 12/2010 | Schaaf | B60N 2/0228 |
| | | | 701/49 |
| 2020/0139814 A1* | 5/2020 | Galan Garcia | B32B 27/065 |
| 2021/0023946 A1* | 1/2021 | Johnson | G06F 3/013 |
| 2021/0107400 A1* | 4/2021 | Erler | B60R 13/02 |

* cited by examiner

METHOD OF MULTI-DIRECTIONAL SEAT ADJUSTMENT USING A POLAR COORDINATE SYSTEM BASED USER INTERFACE

TECHNICAL FIELD

Embodiments of the present disclosure generally relate to vehicle seat controls, and more particularly relate to multi-directional seat adjusting using polar coordinates.

BACKGROUND

Existing seat controls in vehicles typically are unidirectional, and only allow the user to move the seat in one direction at a given time. With modern seat adjusting systems comprising as many as eight directions, the unidirectional seat controls, though allowing the user to adjust the seat to an exact desired position, has typically been unintuitive, inefficient, and inconvenient, thus resulting in an undesirable user experience.

Some vehicles have had seats that can be simultaneously moved in two directions, but those movements have restricted to pre-determined and fixed positions. In doing so, the vehicles have restricted the seat's freedom of motion, and have typically hindered the user's ability to easily position the seat to the most comfortable and ergonomical position.

SUMMARY

Described herein are various embodiments for using a touch screen with polar coordinates thereon to control the movements of seats in a vehicle. An exemplary method of adjusting seats in a vehicle includes the operations of detecting a touching on a circumference of a circular graphic on a touch screen in a vehicle, wherein the circular graphic is in a polar coordinate system on the touch screen; and determining a polar angle formed by a point of the touching on the circumference of the circular graphic in the polar coordinate system. The method further includes the operations of calculating a first value and a second value associated with the polar angle, each of the first value and the second value representing a movement range in a direction; and adjusting a vehicle seat based on the first value and the second value, including simultaneously moving the vehicle seat in in a first direction indicated by the first value and a second direction indicated by the second value.

BRIEF DESCRIPTION OF THE DRAWINGS

The figures of the accompanying drawings provide examples of embodiments. Like references indicate similar elements.

DETAILED DESCRIPTION

Figure 1:
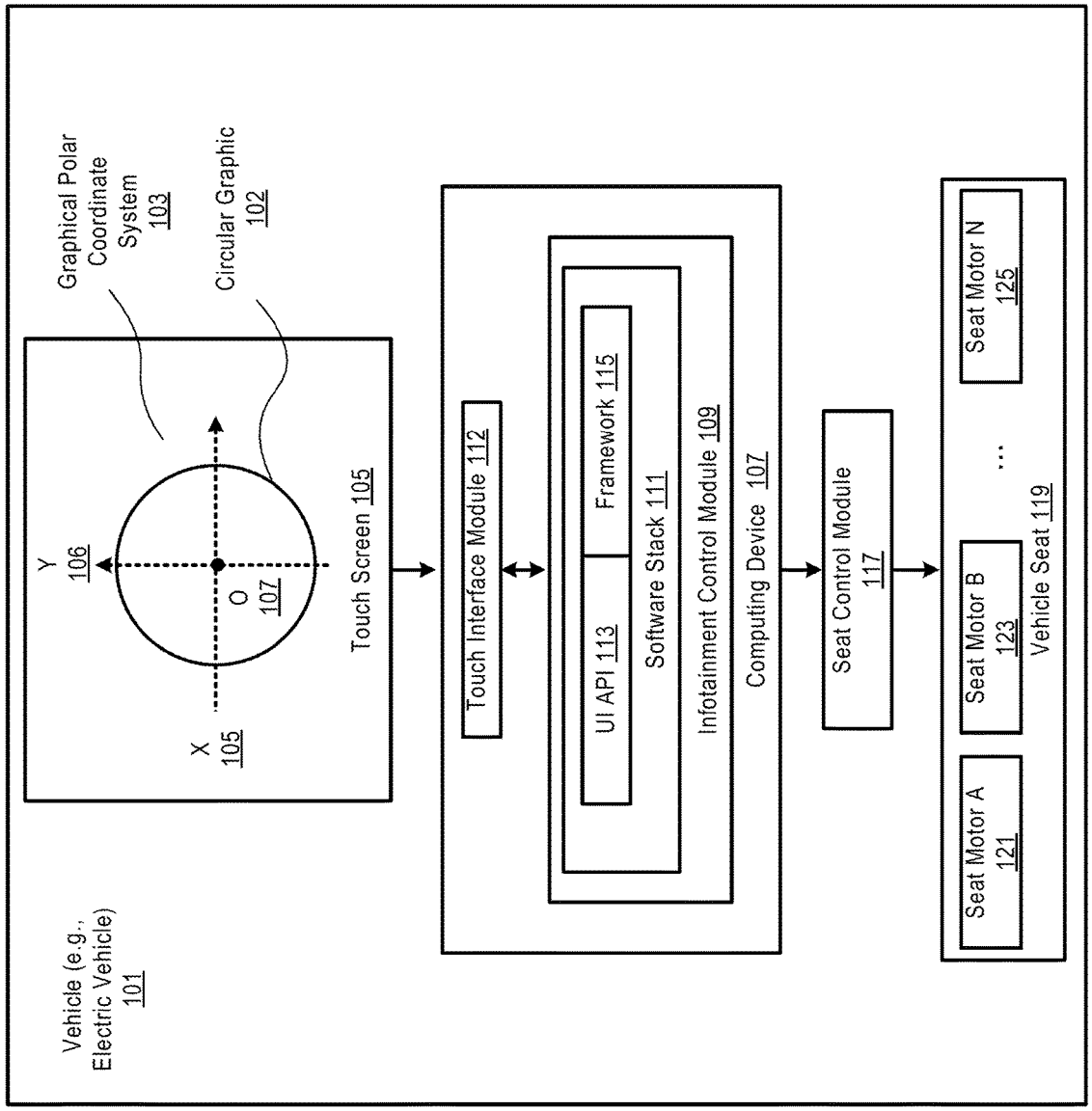
FIG. 1 illustrates an example of a system for adjusting seats in a vehicle in accordance with an embodiment.

As used herein, a vehicle can be a road vehicle (electric or non-electric), such as an automobile, a van, a truck, and a bus; a train; an aircraft, such as an airplane; a spacecraft; or any machinery that transports people or things.

For various embodiments, a touch interface module can detect a touching by a user on a touch screen in a vehicle, and transmit information associated with a polar angle formed by the touching to an infotainment control module. The infotainment control module can translate values associated with the polar angle into parameters for moving a seat in the vehicle. The parameters can be converted by a seat control module into electrical signals, which are sent to a number of motors simultaneously. The motors can be actuated based on the electrical signals to cause the vehicle seat to move to a desired position.

For one embodiment, an exemplary method includes the operations of detecting a touching on a circumference of a circular graphic on a touch screen in a vehicle, where the circular graphic is in a polar coordinate system; and determining a polar angle formed by a point of the touching on the circumference of the circular graphic. The method further includes the operations of calculating a first value and a second value associated with the polar angle, each of the first value and the second value representing a movement range in a direction; and adjusting a seat of the vehicle based on the first value and the second value, including simultaneously or sequentially moving the vehicle seat in in a first direction indicated by the first value and a second direction indicated by the second value.

For one embodiment, the movement range represented by the first value is a percentage of a first maximum movement range configured for the seat in a first direction, and the movement range represented by the second value is a percentage of a second maximum configured for the seat in a second direction. The first value is a sine of the polar angle, and the second value is a cosine of the polar angle. A magnitude of a vector of the polar angle can be used to calculate a speed, at which the seat can be moved simultaneously in the first direction and the second direction.

For one embodiment, the movement of the seat in a direction can be terminated in response to detecting that the touching has been discontinued, that the movement range represented by the first value or the second value has been reached in the corresponding direction, or that a touching at a different point on the circular graphic has occurred. The type of movement associated with each of the first value and the second value of the polar angle is pre-configured based on a magnitude of the polar angle, namely, the magnitude of the angle coordinate associated with the point of touching.

For one embodiment, types of movements associated with the first value can include a tilting up of the seat, a lifting-up of the seat, a lifting down of the seat, or a tilting down of the seat.

For one embodiment, the seat being adjusted trough the polar coordinate system can be a driver seat, a front passenger seat, or a back passenger seat. The touch screen can be positioned in front of the driver seat, between the driver seat and the front passenger seat, or in front of one of many back passenger seats in the vehicle.

For one embodiment, the seat control module receives the first value, the second value, and the magnitude of the vector of the polar angle; and translates each of the first value, the second, and the magnitude of the vector into one or more electrical signals. The electric signals can be sent simultaneously to a number of corresponding motors, each corresponding motor causing a given directional movement to the vehicle seat.

For one embodiment, an exemplary system for adjusting seats in a vehicle can include a processor and a memory coupled to the processor to store instructions, which when executed by the processor, cause the processor to perform the operations of detecting a touching on a circumference of a circular graphic on a touch screen in a vehicle, wherein the circular graphic is in a polar coordinate system; and determining a polar angle formed by a point of the touching on the circumference of the circular graphic. The operations further include calculating a first value and a second value associated with the polar angle, wherein each of the first value and the second value represents a movement range in a direction; and adjusting a seat of the vehicle based on the first value and the second value, including simultaneously moving the vehicle seat in in a first direction indicated by the first value and a second direction indicated by the second value. The system can be implemented according to any of the previous embodiments associated with the exemplary method of adjusting seats in a vehicle.

For one embodiment, a computer program can be stored on a computer readable medium or an integrated circuit that to execute the preceding methods of adjusting seats in a vehicle.

For one embodiment, a third value can be calculated based on the first value and the second value, for use in moving the vehicle seat in a third dimension, e.g., sideways. The third value can be calculated based on a predetermined algorithm or a mapping table between with mapping entries, with each entry mapping a first value, a second value to a third value. There can be some sort mechanism to enable or disable the seat adjustment in three dimensions. We don't even need to claim this embodiment, just a couple of paragraphs describe this idea.

The above summary does not include an exhaustive list of all aspects of the present invention. It is contemplated that the invention includes all systems, computer media, and methods that can be practiced from all suitable combinations of the various aspects summarized above, and also those disclosed in the Detailed Description below.

FIG. 1 illustrates an example of a system for adjusting seats in a vehicle in accordance with an embodiment.

As shown in FIG. 1, the example system includes a computing device 107, which can be installed under a dashboard in a vehicle 101. The computing device 107 can be a system on a chip (SoC), a single package with multiple chips integrated onto a motherboard, or a single device multiple SOCs integrated together.

For one embodiment, the computing device 107 can include multiple virtual machines managed by a hypervisor. Each virtual machine can have a different guest operating system installed thereon. The multiple virtual machines can include a Linux-like operating system, such as Android (from Google of Mountain View, Calif.); and a Unix-like real-time operating system, for example, the QNX® operating system (from Blackberry Limited of Waterloo, Canada). The Unix-like real-time operating system can run driving-critical applications.

For one embodiment, an infotainment control module 109 can run in an Android operating system installed in one of the virtual machines. The infotainment control module 109 can include a software stack 111 comprising a display framework 115 (e.g., an Android Display Framework), and a user interface API 113.

The example system further includes a touch screen 115 that is connected to the computing device 107 using a physical cable (e.g., a HDMI or DVI cable), a wireless connection, or a Bluetooth connection. For one example, the touch screen 105 can be a glass panel covered with a conductive layer and a resistive metallic layer. The two layers can be held apart by spacers. An electrical current can run through the two layers when the example system is operational. When a user touches the touch screen 105 using a finger or a stylus, the two layers can make contact at the touch point (i.e. point of touching), causing a change in the electrical field.

For one embodiment, the display framework 115 and the user interface API 113 can be configured to render images and graphics on the touch screen 105. In this example, a graphical polar coordinate system 103 can be rendered and displayed on the touch screen 105. The graphical polar coordinate system 103 can include an X axis 105 and a Y axis 106 intersecting at a reference point O 107 that overlaps with the center of the circular graphic 102. There can be zero, one, or multiple touching points marked on the circumference of the circular graphic 102. A user can touch a point (marked or unmarked) on the circumference to indicate desired motions of a seat in the vehicle 101. The desired motions can be based on a polar angle formed by the touch point.

As described above, a touching on the touch screen can cause a change in the electric field created by an electrical current running through the conductive layer and a resistive metallic layer of the touching screen 105. For one embodiment, a touch interface module 112 can detect the change in the electrical field, and in response to the change, can calculate polar coordinates of the touch point based on definitions in the user interface API 113. The touch interface module 112 can subsequently translate the polar coordinates into information that the Linux-like operating system (e.g., Android operating system) can understand. The polar coordinates can include a radial coordinate and an angular coordinate. For one embodiment, the radial coordinate can be the radius of the circular graphic 102, and the angular coordinate (i.e., polar angle) can be the magnitude of the angle formed by the touch point.

For one embodiment, the Linux-like operating system can invoke the user interface API 113 to interpret the translated information based on definitions in the user interface API 113 and to translate the information into one or more parameters (e.g., movement ranges in one or more directions) that can be used to actuate motors coupled to the vehicle seat. The parameters can be transmitted to a seat control module 117, which converts the parameters into electrical signals, and sends the electrical signals simultaneously to a number of motors 121, 123 and 125 coupled to the vehicle seat. The motors can be actuated based on the electrical signals to cause the vehicle seat to move to a desired position.

Figure 2:
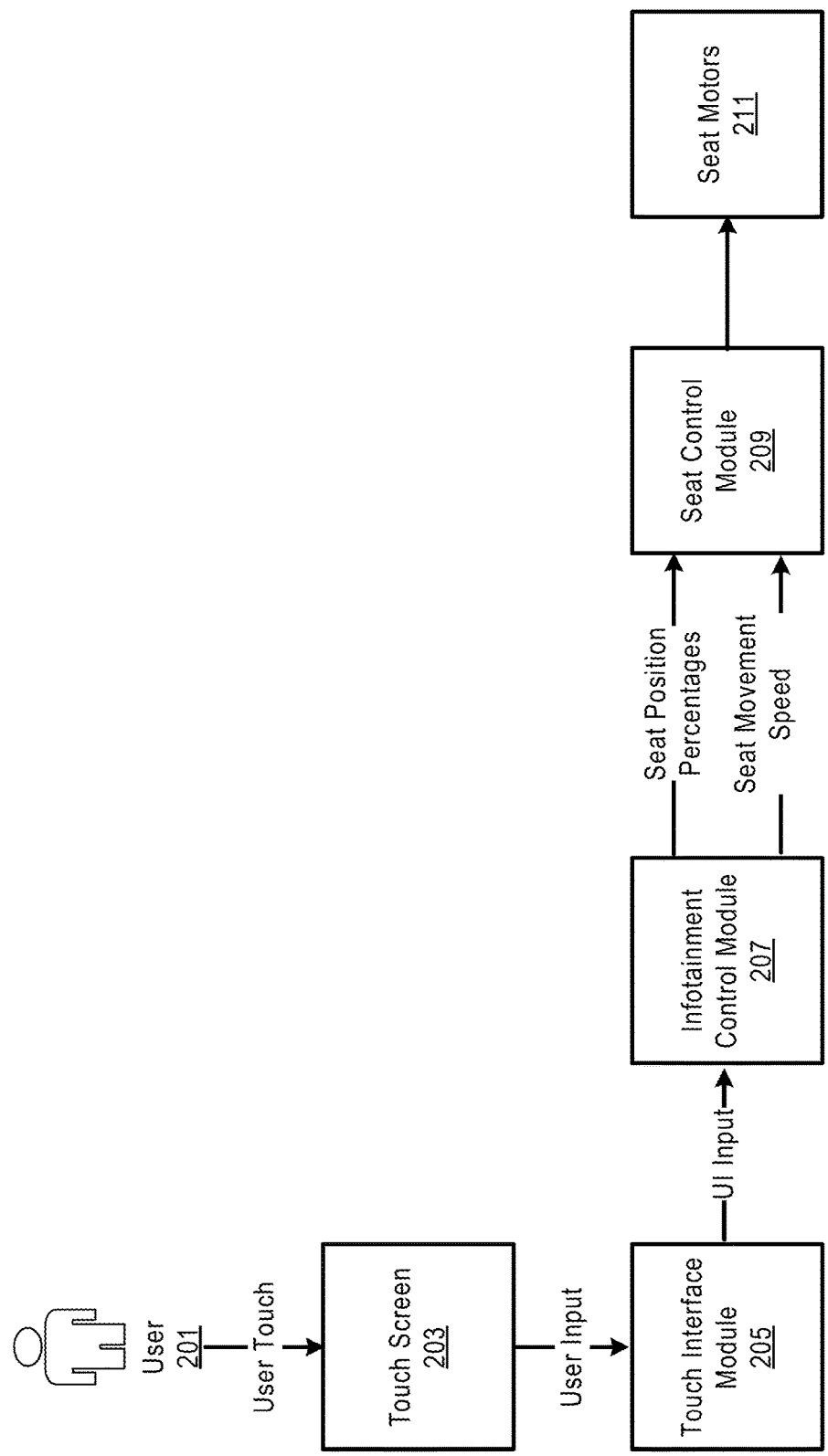
FIG. 2 is a data flow diagram illustrating an example process of adjusting seats in a vehicle in accordance with an embodiment.

FIG. 2 is a data flow diagram illustrating an example process of adjusting seats in a vehicle in accordance with an embodiment. As shown in FIG. 2, a user 201 can touch a touch screen 203 on the circumference of a circular graphic displayed on the touch screen. The circular graphic and an X axis and a Y axis intersecting at the center of the circular graphic can form a polar coordinate system. A touch interface module 205 can detect the touching and determine polar coordinates of the touching point based on definitions in a user interface API (e.g., a user interface API in an Android display framework) installed in an infotainment control module 207.

The infotainment control module 207 can receive the polar coordinates and interpret the polar coordinates as a vector as defined by the user interface API. The user interface API can translate trigonometric values of the polar angle and a magnitude of the vector into a number of seat position percentages and a seat movement speed.

For one embodiment, the trigonometric values can be a sine and a cosine of the polar angle, with the sine representing a percentage of a maximum movement range in a vertical direction and the cosine representing a percentage of a maximum movement range in a horizontal direct. The magnitude of the vector of the polar angle can be used to represent a speed, at which the vehicle seat is to be moved simultaneously in the directions indicated by the trigonometric values Table 1 below illustrates examples of polar angles and their corresponding movement directions and movement ranges.

TABLE 1

| Angle of motion (theta) | Sin (theta) | Cos (theta) |
| --- | --- | --- |
| 0 degrees | 0% tilt | 100% track (forward) |
| 30 degrees | 50% tilt | 87% track (forward) |
| 90 degrees | 100% tilt & lift (up) | 0% track (forward) |
| 120 degrees | 87% lift (up) | −50% track (reverse) |
| 125 degrees | 82% lift (up) | −57% track (reverse) |
| 225 degrees | −71% lift (down) | −71% track (reverse) |

As shown in Table 1, different angles formed by touch points on the circumference of the circular graphic can indicate different movement directions and associated movement ranges. For each angle, there can be two movement directions and two movement ranges. The vehicle seat is to be moved in both directions simultaneously. The vehicle seat can be moved in all directions at the same speed based on a magnitude of a vector of the polar angle. The seat movement percentage in a direction represents a ratio between the seat movement range and a maximum movement range configured for the vehicle seat. The seat movement can be discontinued in all directions when the user removes the touching finger or touching stylus from the touch screen, each movement range has been reached, or the user changes the angle of motion on the touch screen.

The seat movement percentages and the magnitude of the vector can be transmitted to a seat control module 209, and can be translated by the seat control module 209 into electrical signals. The electrical signals can be sent to corresponding seat motors 211, which can be actuated simultaneously by the electrical signals to move the vehicle seat to a desired position.

FIGS. 3A-3D illustrate example touching points and their corresponding movements caused to a vehicle seat in accordance with an embodiment.

Figure 3A:
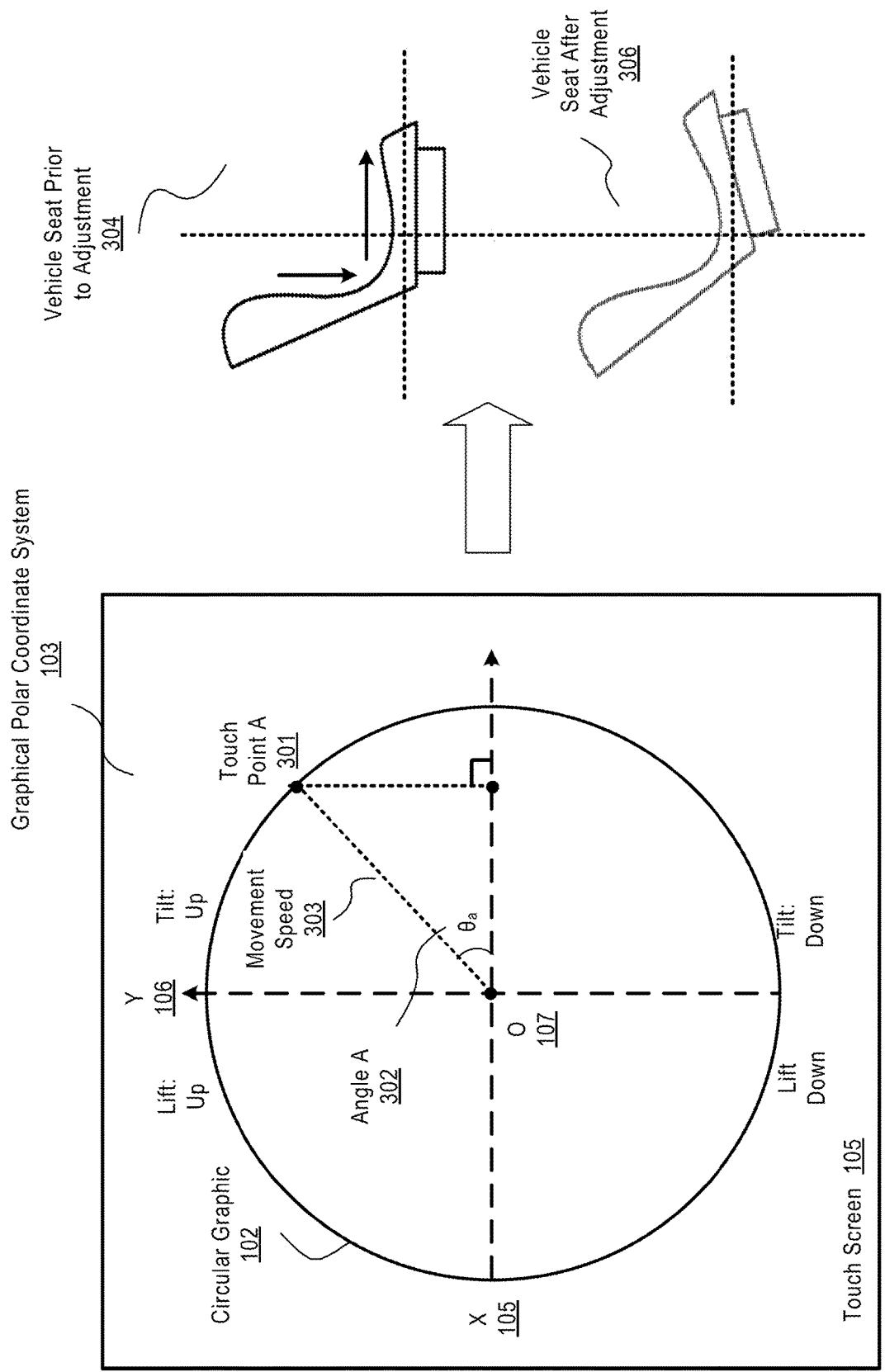
FIGS. 3A-3D illustrate example touch points and corresponding movements caused by the touch points to a vehicle seat in accordance with an embodiment.

FIG. 3A shows a touching at touch point A 301, which creates polar angle A 302, with a magnitude of $\theta_a$. As used herein, a polar angle can be the counterclockwise angle from the positive segment of the x-axis 105. The sine of angle $\theta_a$ can be a percentage of a maximum forward tiling range configured for a vehicle seat, while the cosine of $\theta_a$ can be a percentage of a maximum forward tracking range of the vehicle. The vector magnitude AO can define a movement speed for both the forward tilting and the forward tracking. For one embodiment, a predetermined algorithm can be used to derive the movement speed based on a magnitude of a vector associated with the polar angle. The seat movements caused by touch point A 310 can be shown in positions 304 and 306. The position 304 is the position prior to the seat movement and the position 306 is the seat position after the adjustment, where the seat has been tilt up and tracked forward. A tilting up means the seat is rotated $\theta_a$ degrees such that the back portion of the seat lower that the front portion of the seat.

Figure 3B:
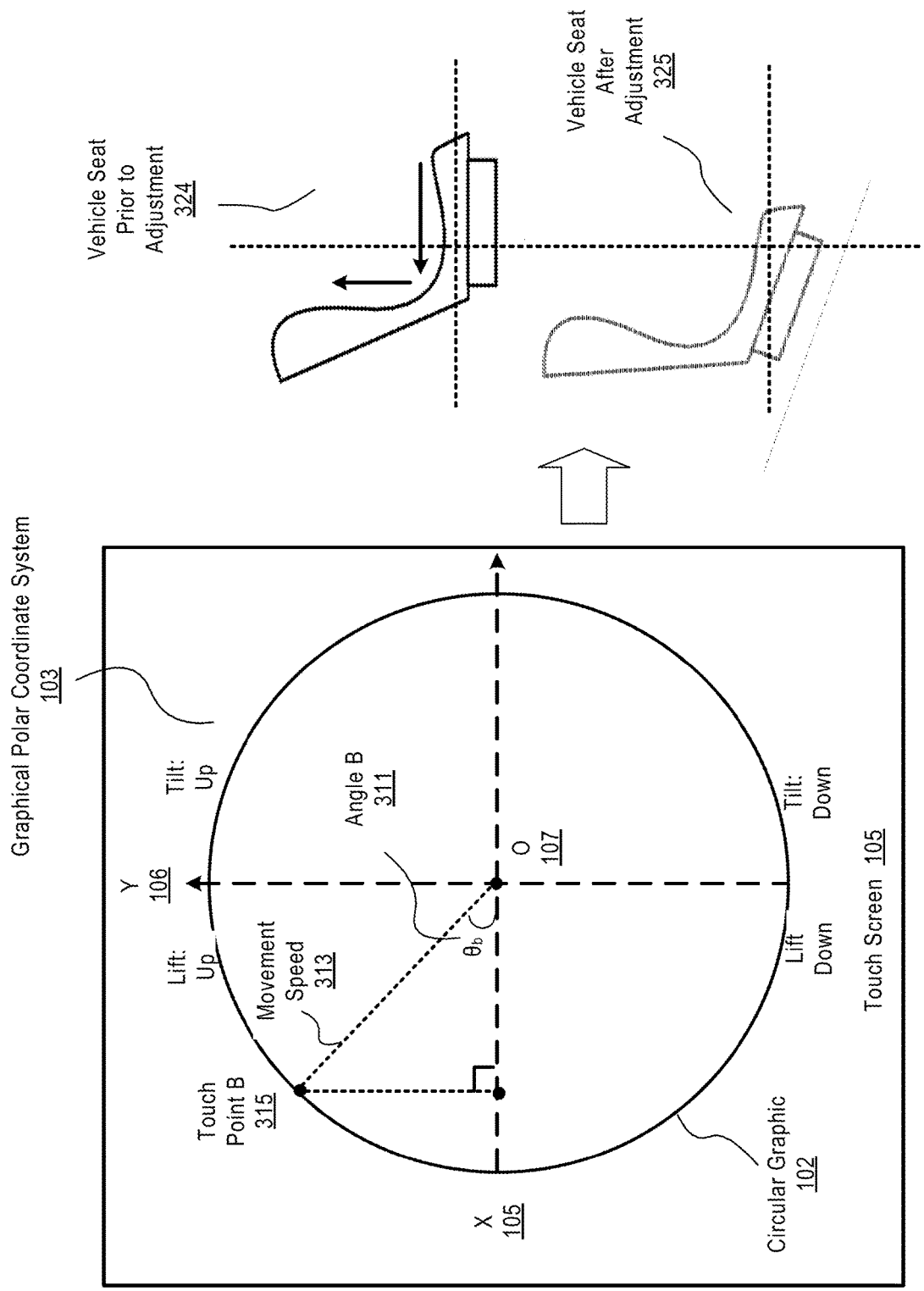

FIG. 3B shows a touching at touch point B 315, which would create angle B 311 with a magnitude of $\theta_b$ and cause the vehicle seat to move simultaneously backward and upward. The movement range in each direction can be respectively defined by the sine and cosine of angle $\theta_b$, and the movement speed in both directions can be defined by the vector magnitude BO. A seat position 324 shows the position of the vehicle seat prior to the movements, and a seat position 325 shows the desired position of the seat after the movements. At the seat position 325, the vehicle seat is lift up and tracked reversely. A lifting up of the seat means that the seat is rotated Ob degrees such that the back portion of the seat higher that the front portion of the seat.

Figure 3C:
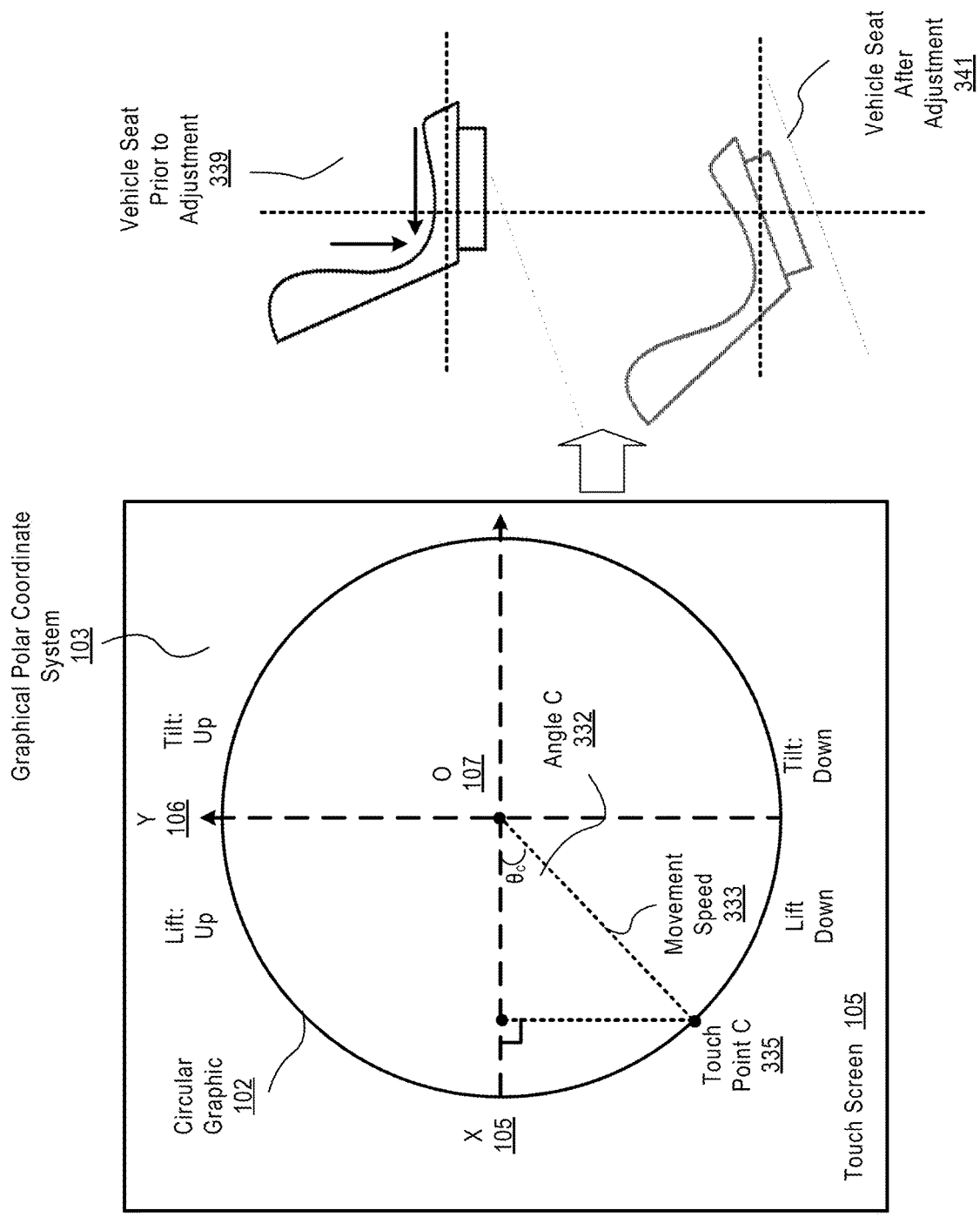

FIG. 3C shows a touching at touch point C 335, which would create angle C 332 with a magnitude of $\theta_c$, and would cause the vehicle seat to move simultaneously backward and downward. The movement range in each direction can be respectively defined by the sine and cosine of angle $\theta_c$, and the movement speed in both directions can be defined by the vector magnitude CO 333. A seat position 339 shows the position of the vehicle seat prior to the movements, and a seat position 341 shows the desired position of the seat after the movements. At the seat position 341, the vehicle seat is lift down and tracked reversely. A lifting down of the seat means that the seat is rotated $\theta_c$ degrees such that the back portion of the seat lower that the front portion of the seat.

Figure 3D:
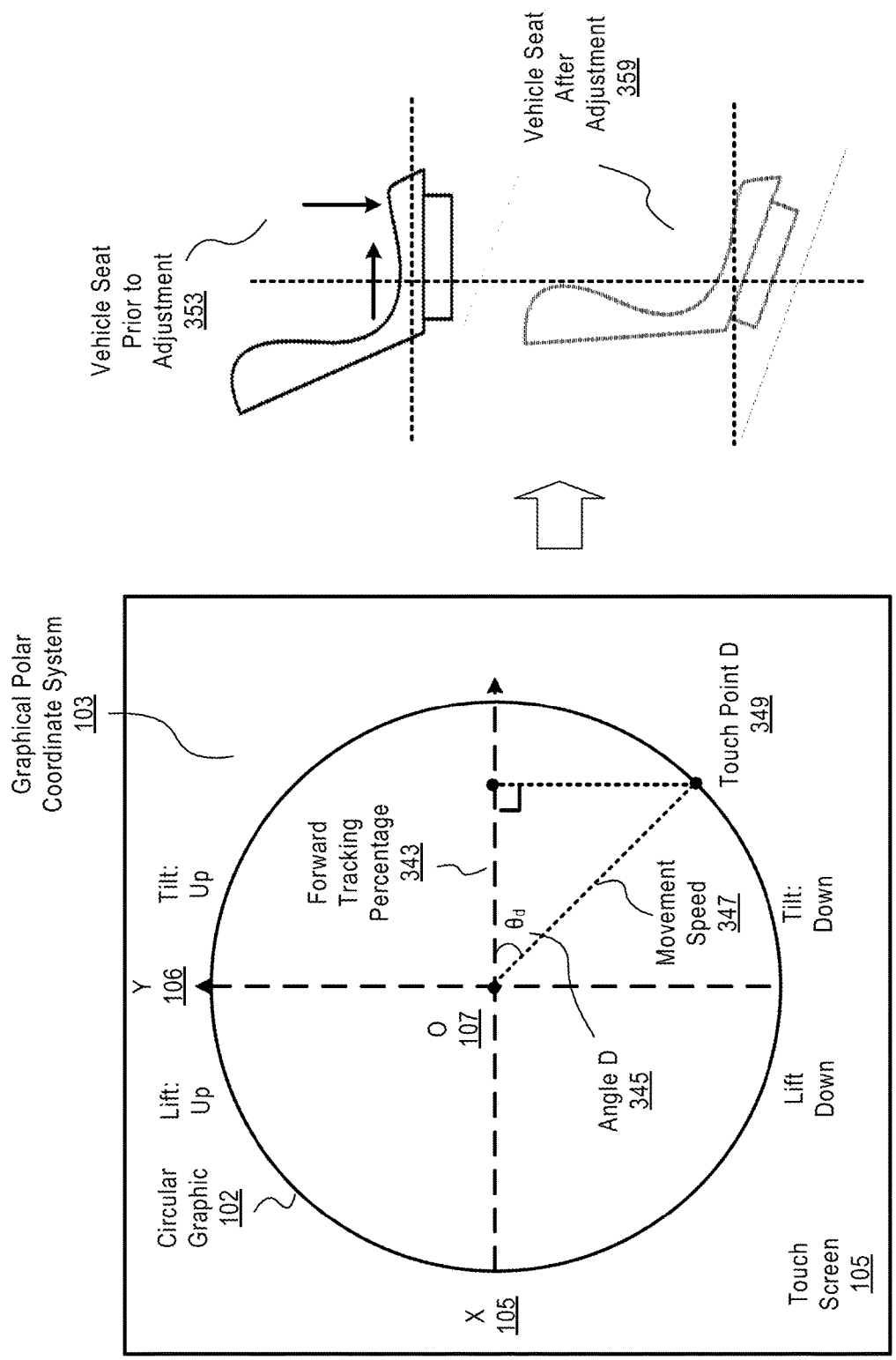

FIG. 3D shows a touching at touch point D 349, which would create angle D 345 with a magnitude of $\theta_d$, and cause the vehicle seat to simultaneously move forward and tilt rearward. The movement range in each direction can be respectively defined by the sine and cosine of angle $\theta_d$, and the movement speed in both directions can be defined by the vector magnitude DO 347. A seat position 353 shows the position of the vehicle seat prior to the movements, and a seat position 359 shows the desired position of the seat after the movements. At the seat position 359, the vehicle seat is tilt down and tracked forward. A tilting down of the seat means that the seat is rotated $\theta_d$ degrees such that the back portion of the seat higher that the front portion of the seat.

Therefore, if a user tracks the circular graphic 102 for 360 degrees, the vehicle would make wave motions.

Figure 4B:
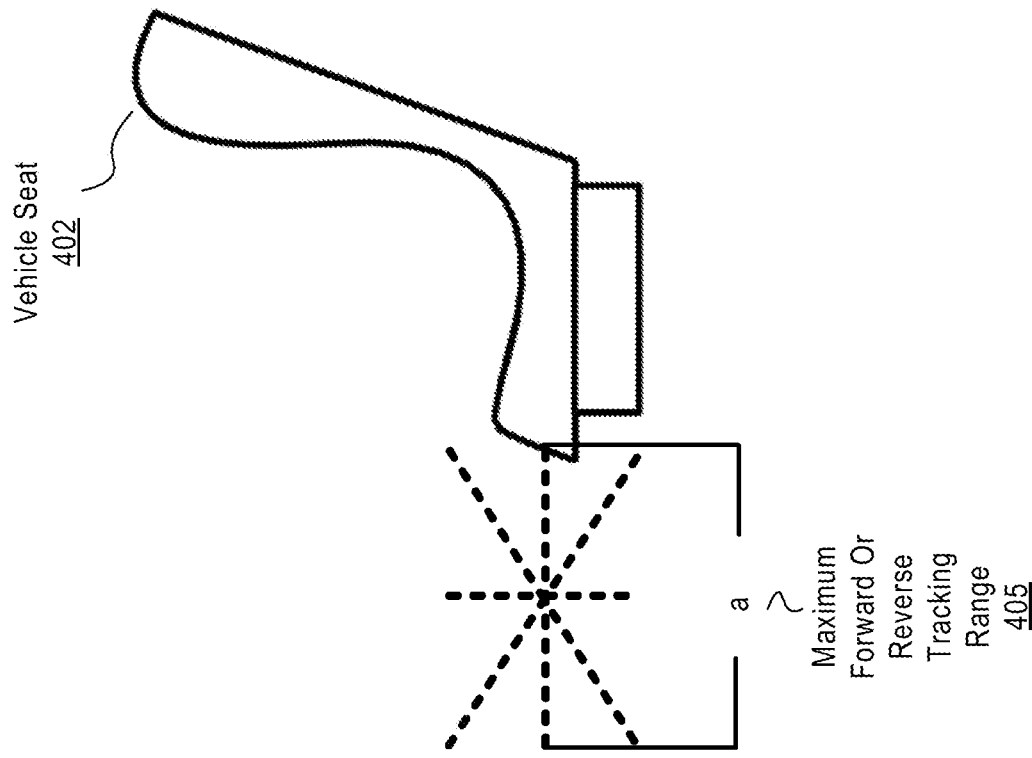
FIGS. 4A-4B illustrate example maximum movement ranges of a vehicle seat in different directions in accordance with an embodiment.
Figure 4A:
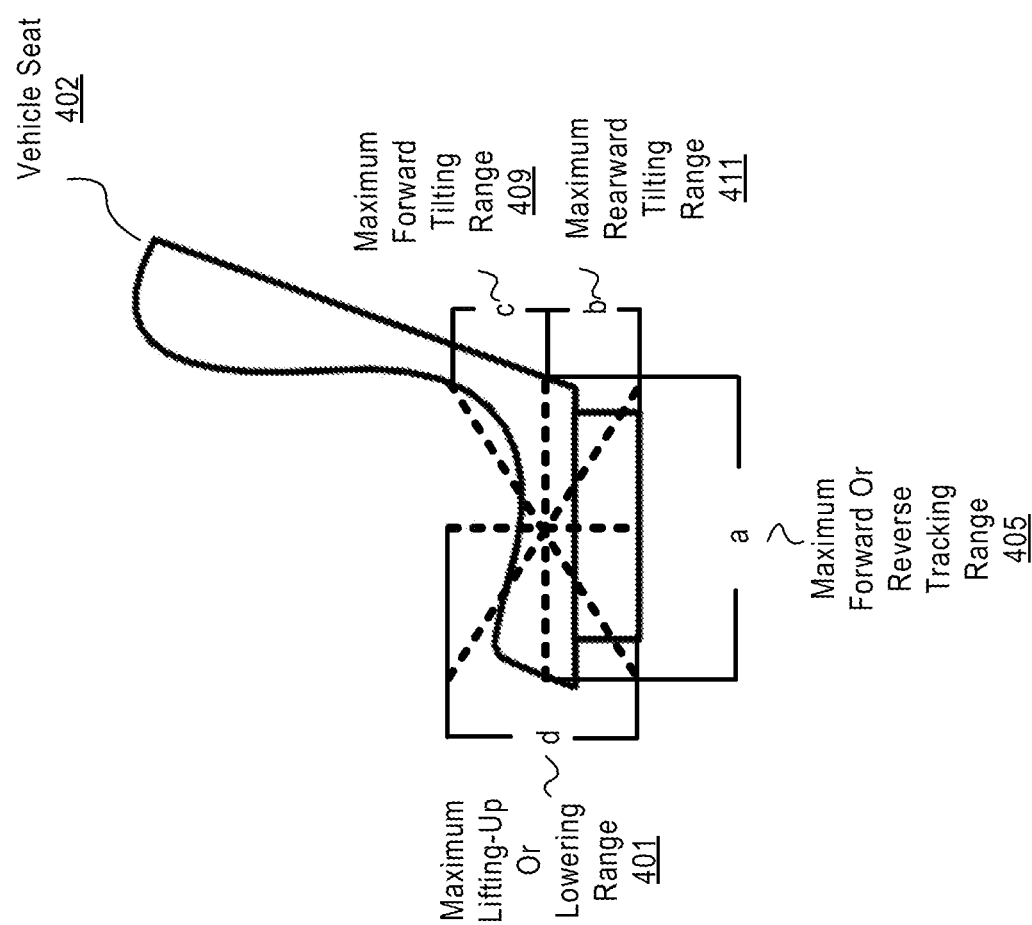

FIGS. 4A-4B illustrate example maximum movement ranges of a vehicle seat in different directions in accordance with an embodiment.

In the example illustrated in FIG. 4A, a vehicle seat 402 can track (move) forward and backward within a maximum movement range a 405, can move up and down within a maximum movement range d 401, can tilt forward within a maximum movement range c 409, and can tilt rearward within a maximum movement range b 411. Each maximum movement range is a maximum range that the vehicle seat can move by design.

Figure 5A:
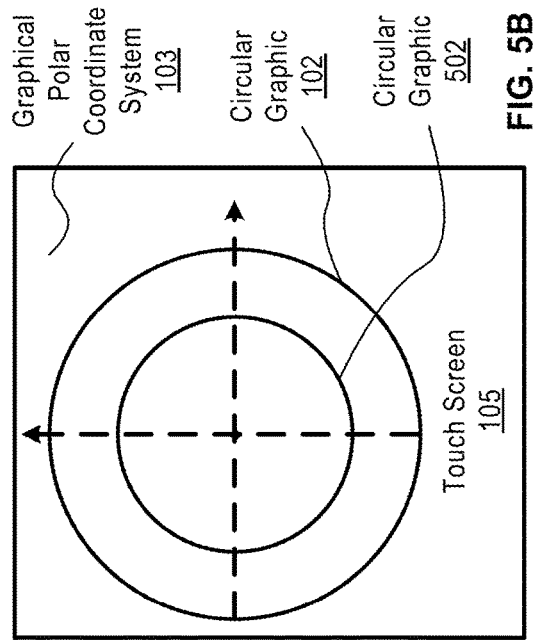
FIGS. 5A-5D illustrate examples of touch screen interfaces in accordance with an embodiment.
Figure 5B:
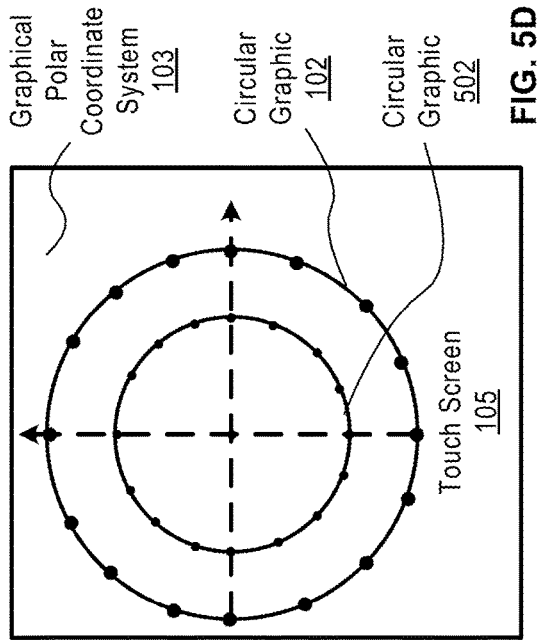

FIG. 5B illustrates a seat position resulted from a touching that creates a polar angle of 180 degrees. Since the cosine of the angle 180 degrees is −1 and the sine of 180 degrees is zero, the touching would prompt the vehicle seat 402 to move backward 100% of the maximum movement range (i.e. movement range a 405) allowed for the vehicle seat 402, without any movement in any other directions.

Figure 5C:
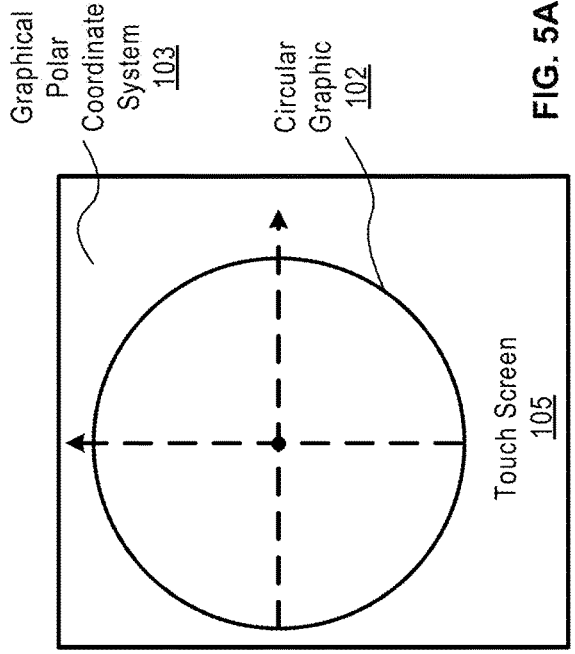

FIGS. 5A-5D illustrate examples of touch screen interfaces in accordance with an embodiment. FIG. 5A and FIG. 5C shows interfaces with a single circular graphic 102. In FIG. 5A, the circular graphic 102 includes zero marked touch points on the circumference, while in FIG. 5B the circular graphic 102 includes multiple equally-spaced touch points on the circumference. For one embodiment, the touch points in FIG. 5B do not have to be equally spaces; instead, the number of the touch points and their positions can be preconfigured by a user using a configuration setting (not shown in the figure).

Figure 5D:
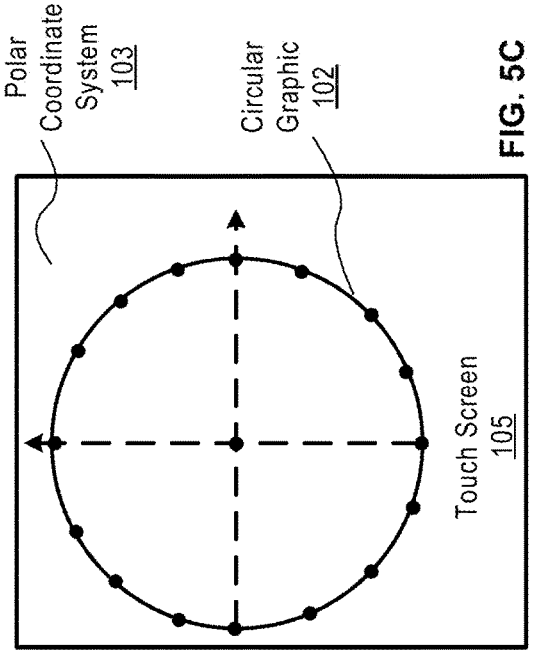

FIG. 5B and FIG. 5D illustrate example touch screen interface with multiple circular graphics. Although each figure of FIG. 5B and FIG. 5D shows two circular graphics (e.g., circular graphic 102 and circular graphic 502), the number of circular graphics in each figure can be preconfigured by a user using the configuration setting mentioned above. Further, there can be multiple touch points clearly marked on the circumferences of each of the circular graphics in FIG. 5D. The number of touch points on each circular graphic, the distance between the touch points and their positions on the circumference can be preconfigured by the user using the configuration setting. For example, in FIG. 5B, there can be multiple touch points marked on only one of the circular graphics while there is zero touch point on the rest of the circular graphics.

Figure 6:
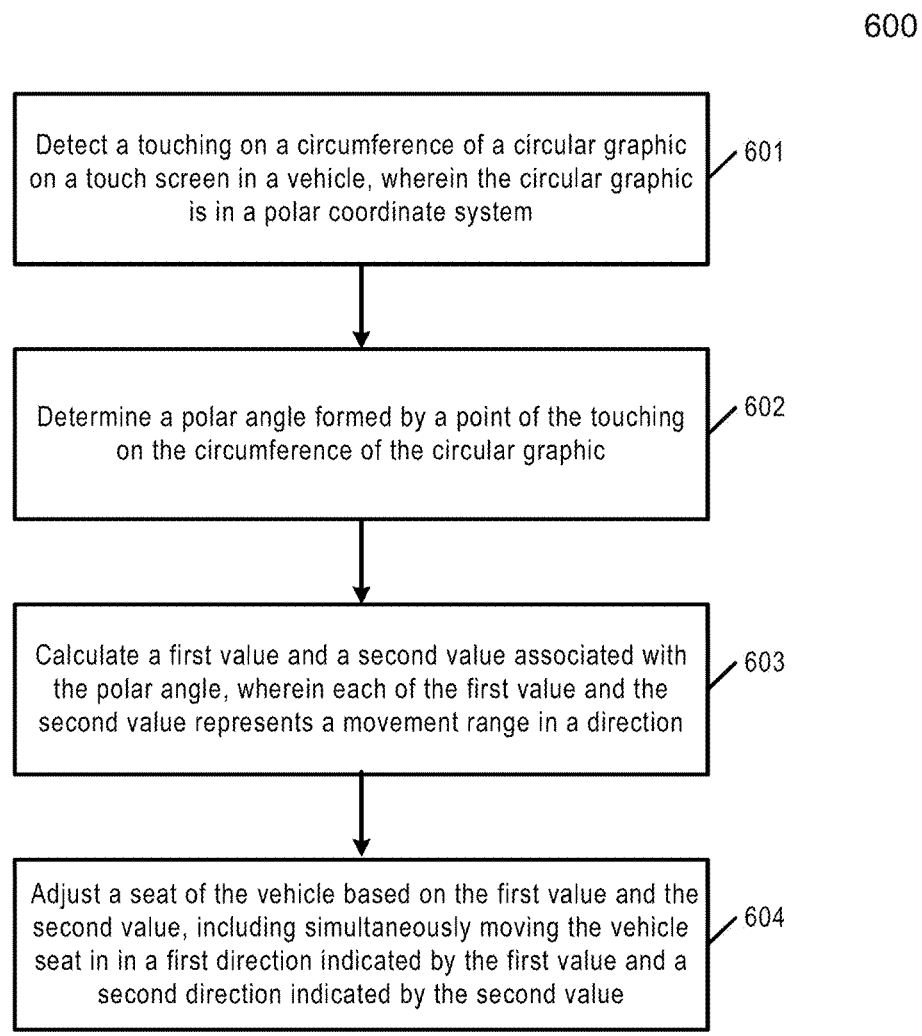
FIG. 6 illustrates an example of a process of adjusting seats in a vehicle in accordance with an embodiment.

FIG. 6 illustrates an example of a process 600 of adjusting seats in a vehicle in accordance with an embodiment. Process 600 may be performed by processing logic which may include software, hardware, or a combination thereof. For example, process 600 may be performed by one or more modules, such as the touch interface module 112, the infotainment module 107 and the seat control module 117 as described in FIG. 1.

Referring back to FIG. 6, in operation 601, the processing logic detects a touching on a circumference of a circular graphic on a touch screen in a vehicle, the circular graphic being in a polar coordinate system. In operation 602, the processing logic determines a polar angle formed by a point of the touching on the circumference of the circular graphic. In operation 603, the processing logic calculates a first value and a second value associated with the polar angle, each of the first value and the second value representing a movement range in a direction. In operation 604, the processing logic adjusts a seat of the vehicle based on the first value and the second value, including simultaneously moving the vehicle seat in in a first direction indicated by the first value and a second direction indicated by the second value.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable one to make or use the methods, systems, and apparatus of the present disclosure. Various modifications to these embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer-implemented method of adjusting vehicle seats in a vehicle, comprising:
  detecting a touching on a circumference of a circular graphic on a touch screen in a vehicle, wherein the circular graphic is in a polar coordinate system;
  determining a polar angle formed by a point of the touching on the circumference of the circular graphic;

calculating a first value and a second value based on the polar angle formed by the point of the touching, wherein each of the first value and the second value represents a movement range and a direction; and adjusting a seat of the vehicle based on the first value and the second value calculated based on the polar angle formed by the point of the touching, including moving the vehicle seat in its entirety in a first direction and within a first range indicated by the first value and in a second direction and within a second range indicated by the second value.

2. The method of claim 1, wherein the movement range represented by the first value is a percentage of a first maximum movement range configured for the seat in a first direction, and wherein the movement range represented by the second value is a percentage of a second maximum movement range configured for the seat in a second direction.

3. The method of claim 2, wherein the first value is a sine of the polar angle, and wherein the second value is a cosine of the polar angle.

4. The method of claim 1,
calculating a magnitude of a vector of the polar angle; and
simultaneously or sequentially moving the vehicle seat in the first direction and the second direction at a speed calculated based on the magnitude of the vector.

5. The method of claim 1, further comprising:
terminating the movement of the vehicle seat in a direction in response to detecting that the touching has been discontinued, that the movement range represented by the first value or the second value has been reached in the corresponding direction, or that a touching at a different point on the circular graphic has occurred.

6. The method of claim 1, wherein the type of movement associated with each of the first value and the second value is pre-configured based on a magnitude of the polar angle.

7. The method of claim 6, wherein the type of movement associated with the first value is one of a tilting up of the seat, a lifting-up of the seat, a lifting down of the seat, or a tilting down of the seat.

8. The method of claim 6, wherein the type of movement associated with the second value is one of a forward tracking of the seat or a reverse tracking of the seat.

9. The method of claim 1, wherein the vehicle seat is one of a driver seat, a front passenger seat, or a back passenger seat, wherein the touch screen is positioned in front of the driver seat, between the driver seat and the front passenger seat, or in front of one of a plurality of back passenger seats in the vehicle.

10. The method of claim 4, further comprising:
receiving, at a seat control module, the first value, the second value, and the magnitude of the vector of the polar angle;
translating, by the seat control module, each of the first value, the second, and the magnitude of the vector into one or more electrical signals; and
sending the translated electric signals simultaneously to a plurality of corresponding motors, each corresponding motor causing a given directional movement.

11. A non-transitory machine-readable medium having instructions stored therein, which when executed by a processor, cause the processor to perform operations, the operations comprising:
detecting a touching on a circumference of a circular graphic on a touch screen in a vehicle, wherein the circular graphic is in a polar coordinate system;

determining a polar angle formed by a point of the touching on the circumference of the circular graphic;
calculating a first value and a second value based on the polar angle formed by the point of the touching, wherein each of the first value and the second value represents a movement range and a direction; and
adjusting a seat of the vehicle based on the first value and the second value calculated based on the polar angle formed by the point of the touching, including moving the vehicle seat in its entirety in a first direction and within a first range indicated by the first value and in a second direction and within a second range indicated by the second value.

12. The non-transitory machine-readable medium of claim 11, wherein the movement range represented by the first value is a percentage of a first maximum movement range configured for the seat in a first direction, and wherein the movement range represented by the second value is a percentage of a second maximum movement range configured for the seat in a second direction.

13. The non-transitory machine-readable medium of claim 11, wherein the first value is a sine of the polar angle, and wherein the second value is a cosine of the polar angle.

14. The non-transitory machine-readable medium of claim 11, the operations further comprising:
calculating a magnitude of a vector of the polar angle; and
simultaneously or sequentially moving the vehicle seat in the first direction and the second direction at a speed calculated based on the magnitude of the vector.

15. The non-transitory machine-readable medium of claim 11, the operations further comprising:
terminating the movement of the vehicle seat in a direction in response to detecting that the touching has been discontinued, that the movement range represented by the first value or the second value has been reached in the corresponding direction, or that a touching at a different point on the circular graphic has occurred.

16. The non-transitory machine-readable medium of claim 11, wherein the type of movement associated with each of the first value and the second value is pre-configured based on a magnitude of the polar angle.

17. The transitory machine-readable medium of claim 16, wherein the type of movement associated with the first value is one of a tilting up of the seat, a lifting-up of the seat, a lifting down of the seat, or a tilting down of the seat.

18. The transitory machine-readable medium of claim 16, wherein the type of movement associated with the second value is one of a forward tracking of the seat or a reverse tracking of the seat.

19. The transitory machine-readable medium of claim 11, wherein the vehicle seat is one of a driver seat, a front passenger seat, or a back passenger seat, wherein the touch screen is positioned in front of the driver seat, between the driver seat and the front passenger seat, or in front of one of a plurality of back passenger seats in the vehicle.

20. A data processing system, comprising:
a processor; and
a memory coupled to the processor to store instructions, which when executed by the processor, cause the processor to perform operations, the operations including
detecting a touching on a circumference of a circular graphic on a touch screen in a vehicle, wherein the circular graphic is in a polar coordinate system;
determining a polar angle formed by a point of the touching on the circumference of the circular graphic, calculating a first value and a second value based on the polar angle formed by the point of the touching, wherein each of the first value and the second value represents a movement range and a direction, and adjusting a seat of the vehicle based on the first value and the second value calculated based on the polar angle formed by the point of the touching, including moving the vehicle seat in its entirety in a first direction and within a first range indicated by the first value and in a second direction and within a second range indicated by the second value.

\* \* \* \* \*